May 27, 1969         S. BRAUNER         3,445,874
PROCESS OF MAKING MOULDED COMPOSITIONS PARTICULARLY FOR FOOTWEAR
Filed April 20, 1964
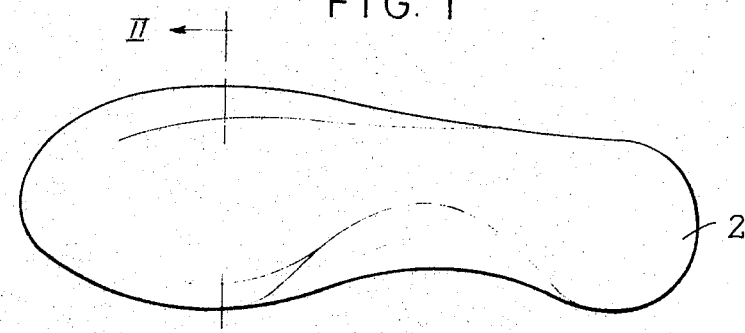
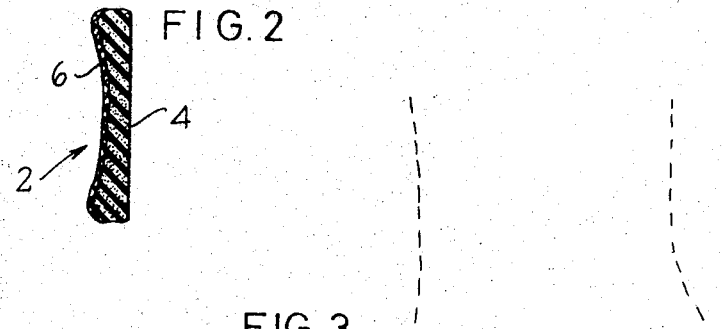
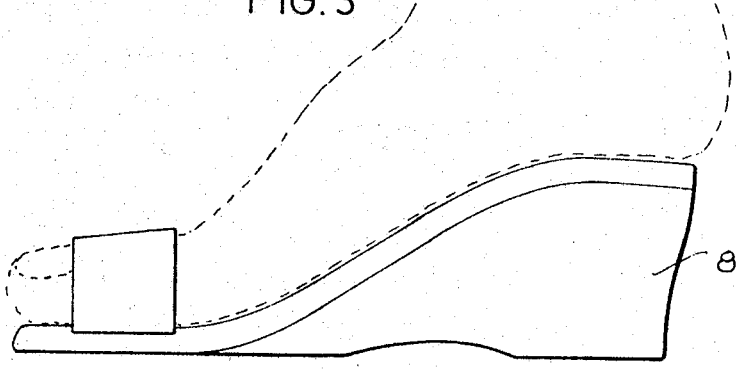
INVENTOR
SHLOMO BRAUNER
BY 3,445,874
PROCESS OF MAKING MOULDED COMPOSITIONS
PARTICULARLY FOR FOOTWEAR
Shlomo Brauner, 46 Yahalom St.,
Ramat-Gan, Israel
Filed Apr. 20, 1964, Ser. No. 361,239
Claims priority, application Israel, June 13, 1963,
19,408
Int. Cl. A43d 65/00
U.S. Cl. 12—146        4 Claims

ABSTRACT OF THE DISCLOSURE

A process of making moulded self-supporting articles, particularly orthopedic middle soles or heels for footwear, comprises introducing into the mould a mixture consisting essentially of cork and rubber latex, the cork constituting 65–85% of the rubber and cork ingredients by dry weight, the upper particle size of the cork being 2–3 mm.; moulding the mixture at a temperature of 200–220° C. at a pressure of 60–100 atmospheres for a period of 3–6 minutes; and removing the moulded article from the mould.

---

The present invention relates to moulded compositions, particularly orthopedic soles and like articles for footwear, and to methods of manufacture of such soles and articles.

Many materials are known for the production of middle and inner soles for shoes, sandals and the like. In most cases there is produced a middle sole, and to this there is attached by means of a suitable adhesive an inner sole of leather or the like. The middle sole is moulded according to the desired predetermined form.

An object of the present invention is to provide an improved moulded composition, particularly orthopedic sole for footwear, and method of manufacture. The invention is applicable also for the production of heels which need no additional support or reinforcement, and therefore another object of the invention is to provide an improved heel and method of manufacture.

According to the invention there is provided a novel self-supporting moulded article of commerce, such as a sole or like article for footwear consisting essentially of a moulded composition of a mixture including cork and rubber, the cork constituting 65–85% of the cork and rubber ingredients of the moulding mixture. As disclosed, the particle size of the cork ranges from 2–3 mm. Also, the moulding mixture preferably includes a gas-releasing agent to form a cellular structure in the rubber.

The soles so produced are particularly useful for making orthopedic footwear (shoes, sandals and the like) which are both sufficiently flexible so as to withstand hard wear and sharp bends and mechanical strain, yet are strong enough not to undergo any deformation of form during prolonged use. Furthermore, the novel soles are comparatively light, flexible, absorb perspiration, and breathe to a very satisfactory degree.

According to a preferred embodiment, the soles are bonded integrally with a suitable cover, such as linen or leather, the latter constituting the inner sole.

According to the invention, the orthopedic middle sole is produced from a special mass and is moulded in the desired orthopedic shape by the application of pressure at elevated temperature, which brings about the curing of the formed part. As indicated above, the inner sole, that is the linen or leather cover, is moulded integrally with the middle sole, eliminating the necessity for attaching such inner sole by adhesive.

The drawing illustrates two embodiments of the invention by way of example. FIGS. 1 and 2 illustrate the invention embodied in an orthopedic middle sole for foot wear, FIG. 2 being a section along lines II—II of FIG. 1; and FIG. 3 illustrates the invention embodied in a heel for footwear.

A better understanding of the invention may be had by referring to the following examples, which illustrate the ranges of the cork and rubber ingredients which may be included in the moulding composition.

Example 1

A moulding composition is prepared by admixing thoroughly the following ingredients, all parts being by weight:

| | Parts |
|---|---|
| Cork, upper size, 2–3 mm. | 82 |
| Natural rubber | 15 |
| Vulcanizing agent (Vulcasit-Ultra, Du Pont) | 1.2 |
| Accelerator (Thruram, Du Pont) | 0.5 |
| Sulphur | 0.8 |
| Ammonia bicarbonate | 0.5 |

Example 2

| | |
|---|---|
| Cork | 60 |
| Rubber | 30 |
| Vulcanizing agent (Vulcasit-Ultra, Du Pont) | 1.2 |
| Styrene | 1.1 |
| Sulphur | 0.8 |
| Zinc oxide | 2.3 |
| Ammonia bicarbonate | 4.6 |

In Example 1, it is seen that the cork constitutes about 85% of the cork and rubber ingredients, and in Example 2, it constitutes about 67% of the two ingredients. In both examples, the cork is upper size of 2–3 mm. particle size. The rubber is a latex, the amounts set above being dry weight of the rubber ingredient. The other ingredients, namely styrene, sulphur, and zinc oxide (which may also be used as the accelerator in Example 1), are well known and are commonly used, respectively, as softeners, vulcanizing agents, and accelerators in vulcanizing rubber. The vulcanizing agent, also a commonly used material, is understood to be $C_{13}H_{13}N_3$ (sym.-diphenylguanidine).

The moulding compositions are thoroughly mixed until a homogeneous doughy mass is obtained. This is formed into a sheet of suitable thickness. From this sheet are cut out parts according to the size and weight (predetermined for each size) of the desired middle sole, and each of these is introduced into a suitable mould, together with an upper and under layer. These may be linen or leather, according to the desired final product. The curing and moulding is effected at a pressure preferably of about 60–100 atmospheres at 200–220° C. for a period of about 3–6 minutes. If the middle soles are to be used for shoes, the upper layer (inner sole) will be leather and this is moulded integrally with the middle sole. If the final product is to be sandals, linen is preferably used. In both cases, there is obtained an integral middle and inner sole which has the desired orthopedic form.

Moulding compositions including cork are very difficult to mould into exact shapes, since cork has a tendency to expand after release of the pressure in the mould. The foregoing compositions, however, have been found to retain their shape after the mould is opened, this being necessary in making orthopedic soles where the upper surfaces are profiled by the mould in accordance with the required foot configuration and must retain that profile after removal from the mould. Also, this moulded composition has been found to undergo very little (negligible) shrinkage after it cools, which is another departure from typical cork compositions.

This novel composition is also suitable for the production of cork heels which need no additional support or reinforcement. Such heels are produced in a similar manner by moulding the moulding composition in suitable moulds. Medium and high heels of adequate strength can thus be produced.

With reference to the drawings, FIG. 1 shows the orthopedic middle sole, generally designated 2, formed in accordance with the invention, the structure being more clearly shown in FIG. 2 as comprising the moulded cork-rubber layer 4 and the top layer 6 of linen or leather. In FIG. 3, the moulded cork-rubber composition is made in the form of a heel 8 of a known type of sandal.

It is to be understood that the described examples of the invention are illustrative only, and that many other examples, variations and applications of the invention, or the several features thereof disclosed, may be made without departing from the spirit or scope of the invention.

What is claimed is:

1. A process of making a moulded self-supporting article characterized in undergoing very little shrinkage and change in shape after removal from the mould, comprising, introducing into the mould a mixture consisting essentially of cork and rubber latex, the cork constituting 65–85% of the rubber and cork ingredients by dry weight, the upper particle size of the cork being 2–3 mm.; moulding said composition to the desired form at a temperature of 200–220° C. at a pressure of 60–100 atmospheres for a period of 3–6 minutes; and removing the moulded article from the mould.

2. A method as defined in claim 1, wherein said moulding mixture includes a gas-releasing agent.

3. A method as defined in claim 1, wherein said composition is moulded into the form of a middle sole for footwear.

4. A method as defined in claim 1, wherein said composition is moulded into the form of a heel for footwear.

References Cited

UNITED STATES PATENTS

| 1,604,659 | 10/1926 | Ross | 36—35 |
| 1,807,341 | 5/1931 | Messler | 36—28 |
| 1,989,853 | 2/1935 | Finn | 36—28 |
| 1,990,937 | 2/1935 | Forbes. | |
| 2,037,105 | 4/1936 | West | 36—32 X |
| 2,250,987 | 7/1941 | Dunbar. | |
| 2,352,148 | 6/1944 | Elkin et al. | 36—30 |

FOREIGN PATENTS 816,548   5/1937   France.

H. HAMPTON HUNTER, *Primary Examiner.*

U.S. Cl. X.R.

36—28, 32, 35; 260—4, 17.4